US007000727B2

(12) United States Patent
Korenjak et al.

(10) Patent No.: US 7,000,727 B2
(45) Date of Patent: Feb. 21, 2006

(54) DIRECT DRIVE ASSEMBLY AND GO-KART CONTAINING SAME

(75) Inventors: Norbert Korenjak, Stadl-Paura (AT); Bernhard Rutershoff, Edt bei Lambach (AT)

(73) Assignee: BRP-Rotax GmbH & Co. KG, Gunskirchen (AT)

( * ) Notice: Subject to any disclaimer, the term of this patent is extended or adjusted under 35 U.S.C. 154(b) by 0 days.

(21) Appl. No.: 09/859,410

(22) Filed: May 18, 2001

(65) Prior Publication Data

US 2002/0017418 A1   Feb. 14, 2002

(30) Foreign Application Priority Data

May 19, 2000 (AT) ............................... A 875 2000

(51) Int. Cl.
*B60K 5/04* (2006.01)
(52) U.S. Cl. .................. 180/292; 180/297; 180/56
(58) Field of Classification Search .............. 180/54.1, 180/56, 62, 291, 292, 297, 364, 374, 383, 180/908; 123/41.44, 192.1; 74/7 R
See application file for complete search history.

(56) References Cited

U.S. PATENT DOCUMENTS

| | | | |
|---|---|---|---|
| 2,782,864 A | 2/1957 | Fessia | |
| 3,096,842 A | 7/1963 | Westmont | |
| 3,169,597 A | 2/1965 | Holloway | |
| 3,799,283 A | 3/1974 | Freber | |
| 4,071,008 A * | 1/1978 | Skatsche et al. | 123/198 E |
| 4,288,096 A | 9/1981 | Enokimoto et al. | |
| 4,425,976 A | 1/1984 | Kimura | |
| 4,448,279 A * | 5/1984 | Watanabe et al. | 180/297 |
| 4,494,637 A * | 1/1985 | Gotoda et al. | 192/48.4 |
| 4,593,785 A * | 6/1986 | Yamamoto et al. | 180/291 |
| 4,674,589 A * | 6/1987 | Szymkowiak | 180/215 |
| 4,798,254 A * | 1/1989 | Lings | 180/58 |
| 4,821,827 A | 4/1989 | Reese | |
| 4,828,017 A | 5/1989 | Watanabe et al. | |
| 4,924,959 A * | 5/1990 | Handa et al. | 180/297 |

(Continued)

FOREIGN PATENT DOCUMENTS

CH   590 149   7/1977

(Continued)

OTHER PUBLICATIONS

Baumeister and Marks, "Standard Handbook for Mechanical Engineers", McGraw-Hill, Seventh Edition, pp. 8-87 through 8-94.*

(Continued)

*Primary Examiner*—Frank Vanaman
(74) *Attorney, Agent, or Firm*—Osler, Hoskin & Harcourt, LLP

(57) ABSTRACT

A go-kart drive assembly with an internal combustion engine in the form of a reciprocating-piston or rotary-piston engine as a power source is described. The drive assembly includes a spur-gear reduction gearing between the internal combustion engine and a rear-wheel drive shaft of the go-kart. The spur-gear reduction gearing and the crank shaft (17) of the reciprocating engine or the engine shaft of the rotary-piston engine (17a) are accommodated in a common housing (10) that is preferably closed. The space or spaces (a, b) between the shafts of the spur-gear reduction gearing (27, 29; 30, 33) is fixed in the housing (10) so as to be invariable. The driving gear wheel (27) of the gearing (26) is mounted on the crank shaft (17) or the engine shaft (17a) and the driven gear wheel (33) of the gearing (26) is mounted on the rear-wheel drive shaft (6).

26 Claims, 13 Drawing Sheets

U.S. PATENT DOCUMENTS

| | | | |
|---|---|---|---|
| 5,014,841 A | 5/1991 | Gillespie | |
| 5,186,078 A | 2/1993 | Kameda et al. | |
| 5,720,248 A * | 2/1998 | Crofts | 123/192.1 |
| 5,829,401 A * | 11/1998 | Masuda | 123/179.25 |
| 6,056,080 A * | 5/2000 | Clavel | 180/291 |
| 6,213,063 B1 * | 4/2001 | Nakano et al. | 123/41.44 |
| 6,260,515 B1 * | 7/2001 | Tosaka et al. | 123/41.08 |

FOREIGN PATENT DOCUMENTS

| | | |
|---|---|---|
| DE | 9 34 686 | 11/1955 |
| DE | 28 03 840 | 3/1979 |
| DE | 29 41 517 | 4/1980 |
| DE | 31 30 984 | 7/1982 |
| DE | 3302844 A1 | 8/1984 |
| DE | 39 21 414 | 1/1990 |
| DE | 40 29 058 | 3/1992 |
| EP | 0 327 761 | 8/1989 |
| EP | 0 416 636 | 3/1991 |
| EP | 0656315 A1 | 6/1995 |
| FR | 2 302 000 | 9/1976 |
| FR | 2 603 529 | 3/1988 |
| FR | 2 759 031 | 8/1998 |
| GB | 2 212 464 A | 7/1989 |
| WO | WO 99/12797 | 3/1999 |

OTHER PUBLICATIONS

Austrian Search Report for Austrian Patent Application No. A 875/2000-1 citing the references listed above (dated May 23, 2001).

European Search Report dated May 19, 2003.

* cited by examiner

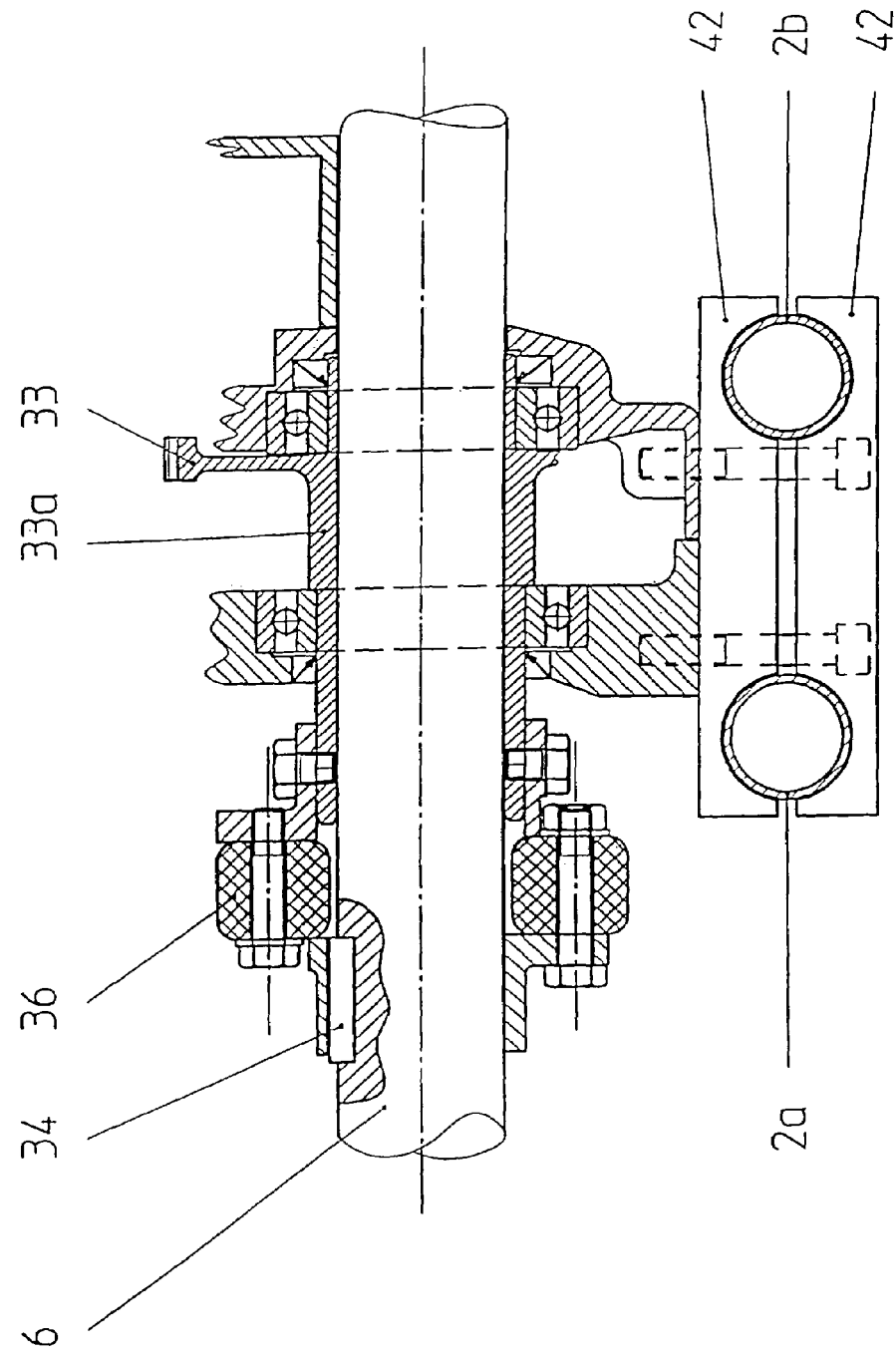

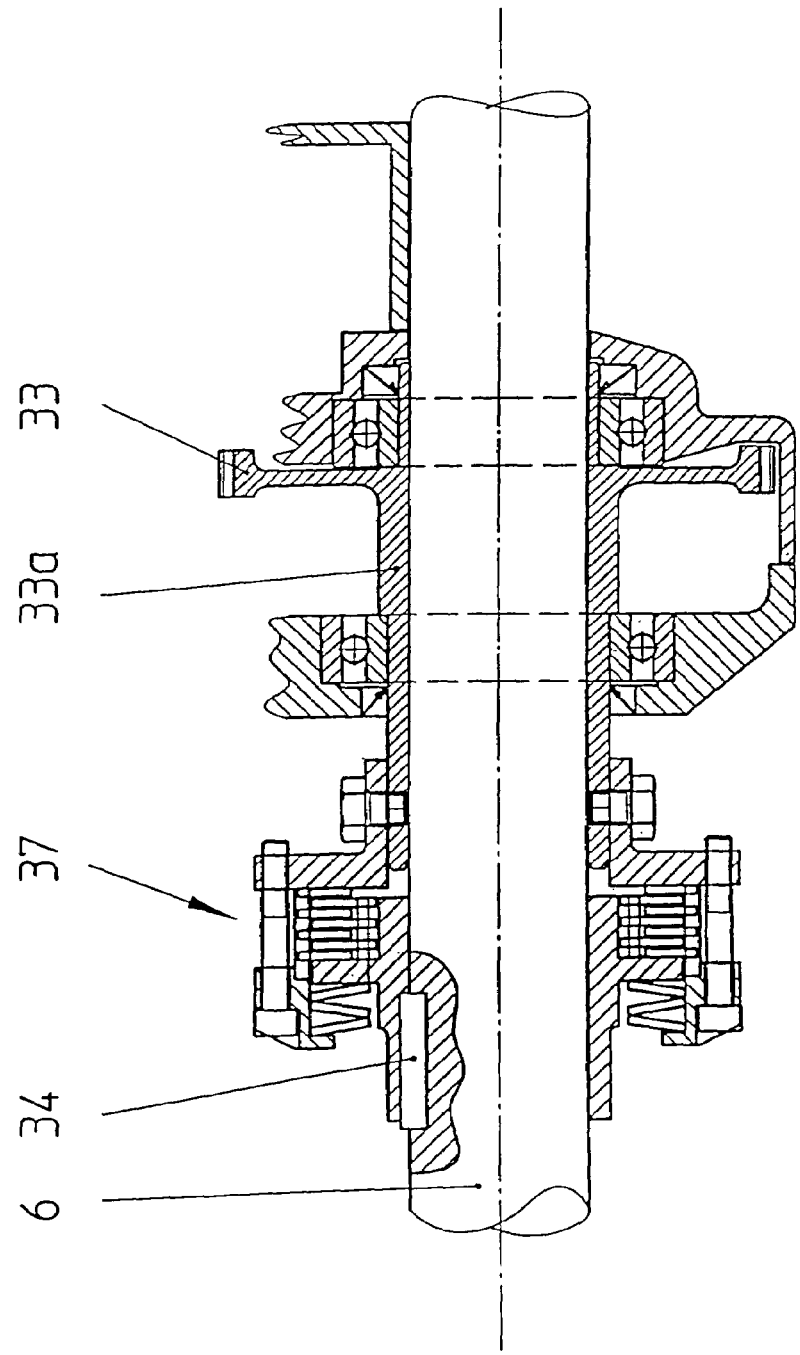

10  43  2a  45  2b  43

10  2a  45  44  2b

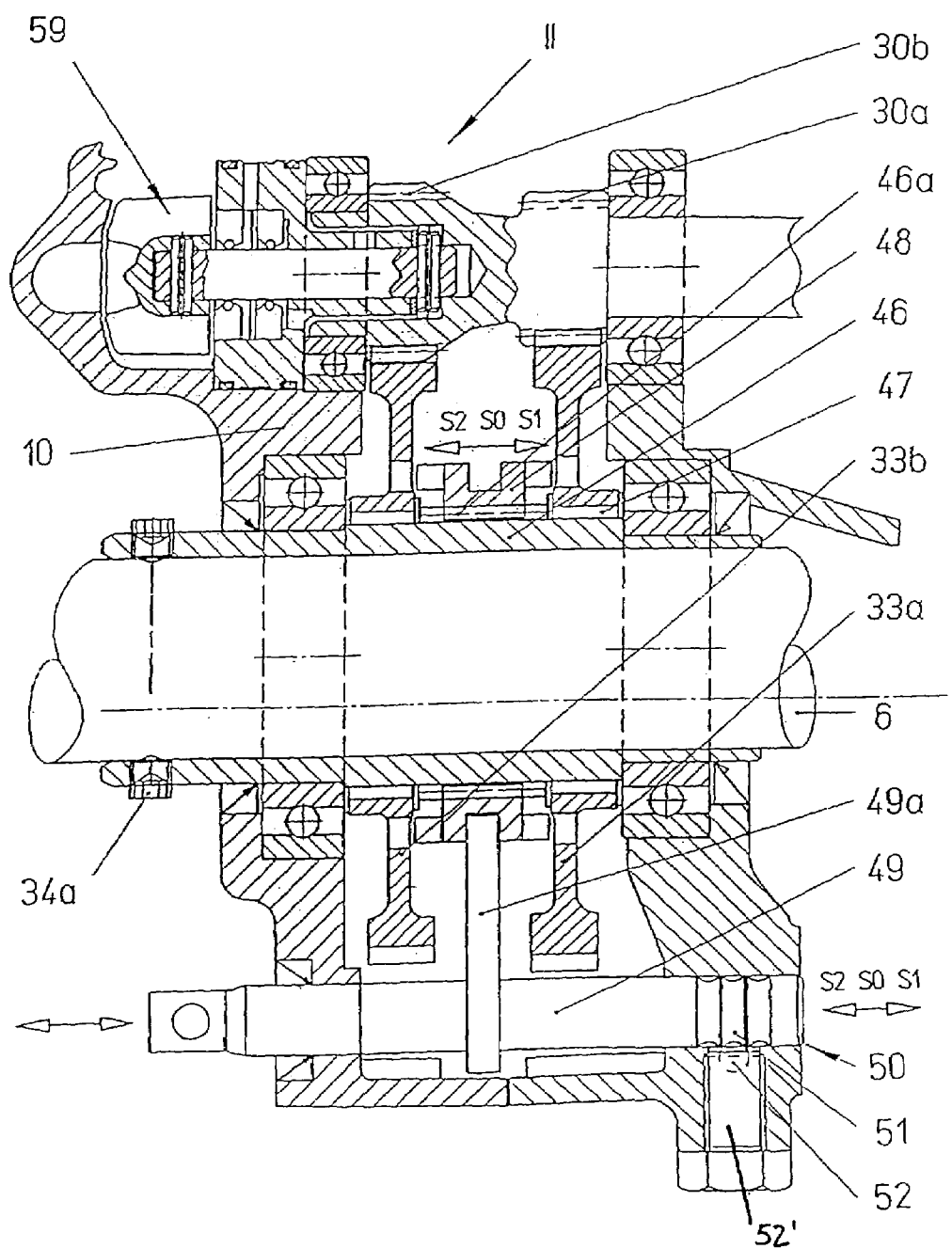

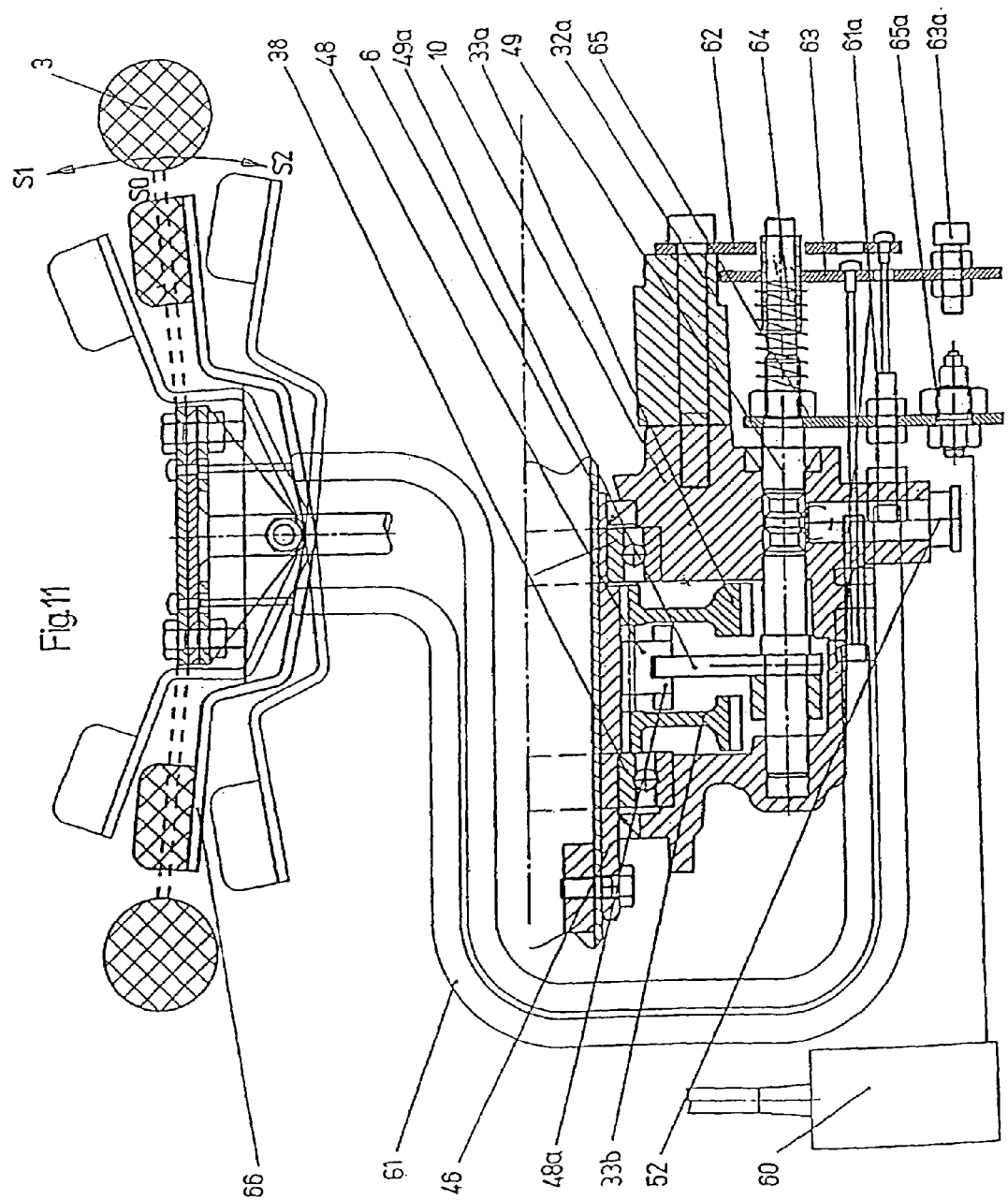

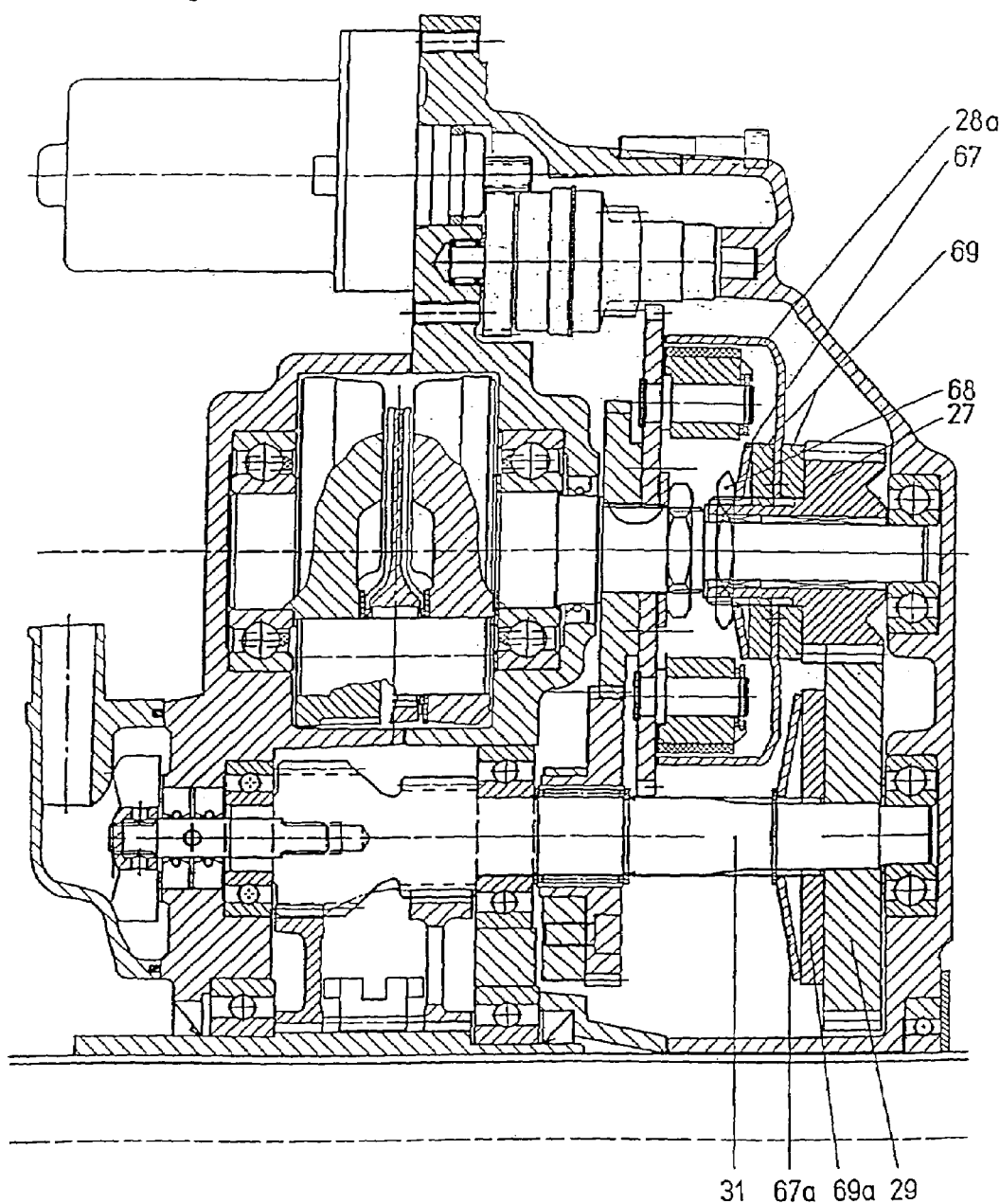

DIRECT DRIVE ASSEMBLY AND GO-KART CONTAINING SAME

FIELD OF THE INVENTION

The present invention relates to a go-kart drive assembly comprising an internal-combustion engine in the form of a reciprocating-piston or rotary-piston engine as the power source, and with spur-gear reduction gearing between the internal-combustion engine and a go-kart rear-wheel drive shaft; the present invention also relates to a go-kart with such a drive assembly.

BACKGROUND OF THE INVENTION

Go-karts are motor vehicles that are used for leisure and sporting activities. In go-karts, a chain is usually used to transmit power from the engine to the rear-wheel drive shaft; this chain is routed around a engine pinion and a sprocket that is mounted on the rear-wheel drive shaft. In order to achieve the large reduction ratio that is needed by using this single-stage chain drive, it is necessary to make the engine pinion extremely small (tooth count: 9–11). For technical reasons, smaller pinions cannot be made. On the other hand, there is a limit to the extent to which the driven sprocket on the rear-wheel drive shaft can be made larger because of the low ground clearance of the vehicle. If the driven sprocket is too large, it will hit the ground. The chain is exposed, i.e., it is not protected by a chain guard. The chain is lubricated manually, at more or less regular intervals.

Such extreme operating conditions, combined with the high speed at which the chain moves—modern go-kart engines run at speeds of up to 21,000 rpm—place extremely high stresses on the chain drive system and these are linked to high rates of wear, a rapid loss of efficiency, short service life, and excessive noise. The outcome is that the chain, which is costly in and of itself, as well as the sprocket, have to be replaced at very short intervals.

CH 590149 A and FR 2302000 A (and similarly GB 2 212 464 A) propose that the chain drive be replaced by spur gearing in order to eliminate the problems referred to above. If this is done, the spur gearing forms a drive unit that is separate from the engine and is enclosed, at least partially, by its own housing. In order to match the reduction ratios to various driving conditions, at least one of the gear wheels can be replaced by another having a greater or smaller tooth count. The engine is installed on a mounting plate in such a way that it can be moved and thereby compensate for the differences in the diameters of the gear wheels that result from such an installation.

One disadvantage with this concept is that it is extremely difficult to achieve the precise alignment of two spur gears that mesh with each other, which is necessitated by such gearing, if the variable engine installation concept that has been proposed is used. Small misalignments inevitably lead to greater stresses, increased wear, and to even more noise.

An additional disadvantage is the fact that complete encapsulation of the transmission is difficult because of the separation of the engine from the transmission, and because of the variable engine mounting; in addition, an installation of this kind makes it almost impossible to avoid oil leaks.

SUMMARY OF THE INVENTION

It is the objective of the present invention to describe a go-kart drive assembly of the type described in the introduction hereto, which is based on a compact engine-transmission assembly, which eliminates the difficulties outlined above, and which minimizes the user's maintenance costs.

In order to achieve this objective, in a go-kart drive assembly of the type defined heretofore the present invention stipulates that the spur-type gearing, with the crankshaft of the reciprocating-piston engine or the engine shaft of the rotary-piston engine, be accommodated in a common, preferably enclosed, housing such that the space(s) between the gear-wheel shafts be invariable; and such that the driving gear wheel of the gearing be mounted on the crankshaft or engine shaft, and the driven gear wheel be installed on the rear-wheel drive shaft. In the case of spur-type multi-stage gearing, provision is made for specified, unchangeable spacing of the shafts between the individual stages of the gearing; the driving gear wheel of the first stage of the gearing is mounted on the crank shaft or engine shaft, and the driven gear wheel of the final stage of the gearing is mounted on the rear-wheel drive shaft. In total, this results in a compact drive assembly with precisely aligned gear wheels in the form of a direct drive for the rear-wheel drive shaft of the go-kart. In order to prevent oil leaks, it is preferred that the common housing be enclosed.

More advantageously, the driving pinion of the gearing (in the case of multi-stage gearing, the first stage of the gearing) is mounted on the crank shaft or engine shaft in such a way that it can rotate, and is connected to the crank shaft or engine shaft through a clutch, preferably a centrifugal clutch, so that engine torque can be applied to the gearing in an efficient manner.

The rear-wheel drive shaft can be installed according to two different concepts:

In the first instance, the rear-wheel drive shaft can be installed directly in the engine-transmission housing in such a manner that it can rotate. It is preferred that the driven gear wheel of the gearing (or of the final stage of the gearing) be connected to the rear-wheel drive shaft through a connecting element, e.g., a bolt, so as to be removable, said connecting element being accessible through a closable opening in the housing. The rear-wheel drive shaft can be made in three sections and consist of a centre section of the shaft that is arranged in the housing so as to be able to rotate therein, and two other shaft sections; one end of each of these outer shaft sections is connected to the centre section of the shaft so as to be removable therefrom, i.e., by means of a bolted connection. At their outboard ends, each of these two sections of the shaft supports a rear wheel. Dividing the rear-wheel drive shaft in this way entails the advantage that should the shaft fail, only the affected section of the shaft need be replaced, which results in a significant reduction in the time and cost of repairs.

In the second instance, the rear-wheel drive shaft can be installed indirectly in the housing—through the driven pinion of the gearing, (or the last stage of the gearing) that is made in one piece with a hollow shaft—so as to be able to rotate within the housing. In this case, the rear-wheel drive shaft is connected to the hollow shaft in such a way that it is removable, e.g., by being keyed onto the shaft. A flexible coupling, e.g., a rubber element and/or a friction clutch, can be used to damp torsional oscillations and to provide protection against load peaks. Generally speaking, in order to avoid torque peaks in the drive train, it is advantageous if an overload coupling be incorporated in the drive train.

Installation of the engine-transmission housing in a tubular frame, i.e., in a chassis that is formed as a tubular structure, is effected, for example, by using at least one bolted clamp, on at least one chassis tube. An alternative installation concept is characterized in that the housing partially fills the space between two parallel chassis tubes, and is clamped between the two chassis tubes by at least one releasable clamp, for example a bolted clamp or a strap clamp. The part of the housing that is located between the two chassis tubes can serve as an additional oil reservoir.

A particularly compact engine-transmission design will result if the gearing is configured with two stages and the driven gear wheel of the first stage of the gearing and the driving gear wheel of the second stage of the gearing are mounted on a common lay shaft (intermediate shaft). In this case, it is recommended that the first stage of the gearing be configured as a change-speed transmission, i.e., the gear wheels of the first stage of the gearing are replaceable gear wheels of different diameters to provide the different reduction ratios. That part of the housing that encloses the replaceable gear wheels is more usefully configured as a removable cover.

In order that the reduction ratio can be changed when the vehicle is in motion, the gearing, and in particular the second stage of the gearing or, more generally, the final stage of the gearing, can be in the form of a multi-gear, change-speed transmission. For reasons of safety, it is also advantageous if a gear-shift lever that is mounted on the steering wheel be associated with the change-speed transmission, this gear-shift lever being connected to a selector shaft of the change-speed transmission by way of a cable or Bowden cable.

The two-stage gearing described above which is the preferred type, also permits the space-saving integration of a balance weight, a starter assembly, and a water pump,

- a balance weight that is configured as a gear wheel being mounted on the lay shaft so as to be able to rotate thereon; this is driven by a gear wheel of identical diameter that is mounted on the crank shaft (reduction gear ratio 1:1);
- a starter ring gear being mounted on the crank shaft or engine shaft; this is driven by a starter motor through an interposed starter lay shaft gear train; and/or
- a cooling water pump being arranged coaxially with the lay shaft, this being driven by the lay shaft.

BRIEF DESCRIPTION OF THE DRAWINGS

The present invention will be described in greater detail below on the basis of preferred embodiments shown in the drawings appended hereto. These drawings show the following:

FIG. 5 is a cross section through a rear-wheel drive shaft mounting in the engine-transmission housing, with a flexible coupling;

FIG. 6 is a cross section through a rear-wheel drive shaft mounting in the engine-transmission housing, with a friction clutch;

FIG. 10 is a cross section through the second stage of the gearing, which is in the form of a two-gear change-speed transmission;

FIG. 11 is a section through part of a transmission such as that shown in FIG. 10, with a gear shift that is mounted on the steering-wheel and used to change gears, as is shown diagrammatically in cross section; and FIG. 12 is a cross section through a transmission that incorporates an overload coupling.

DETAILED DESCRIPTION OF THE PREFERRED EMBODIMENTS

Figure 1:
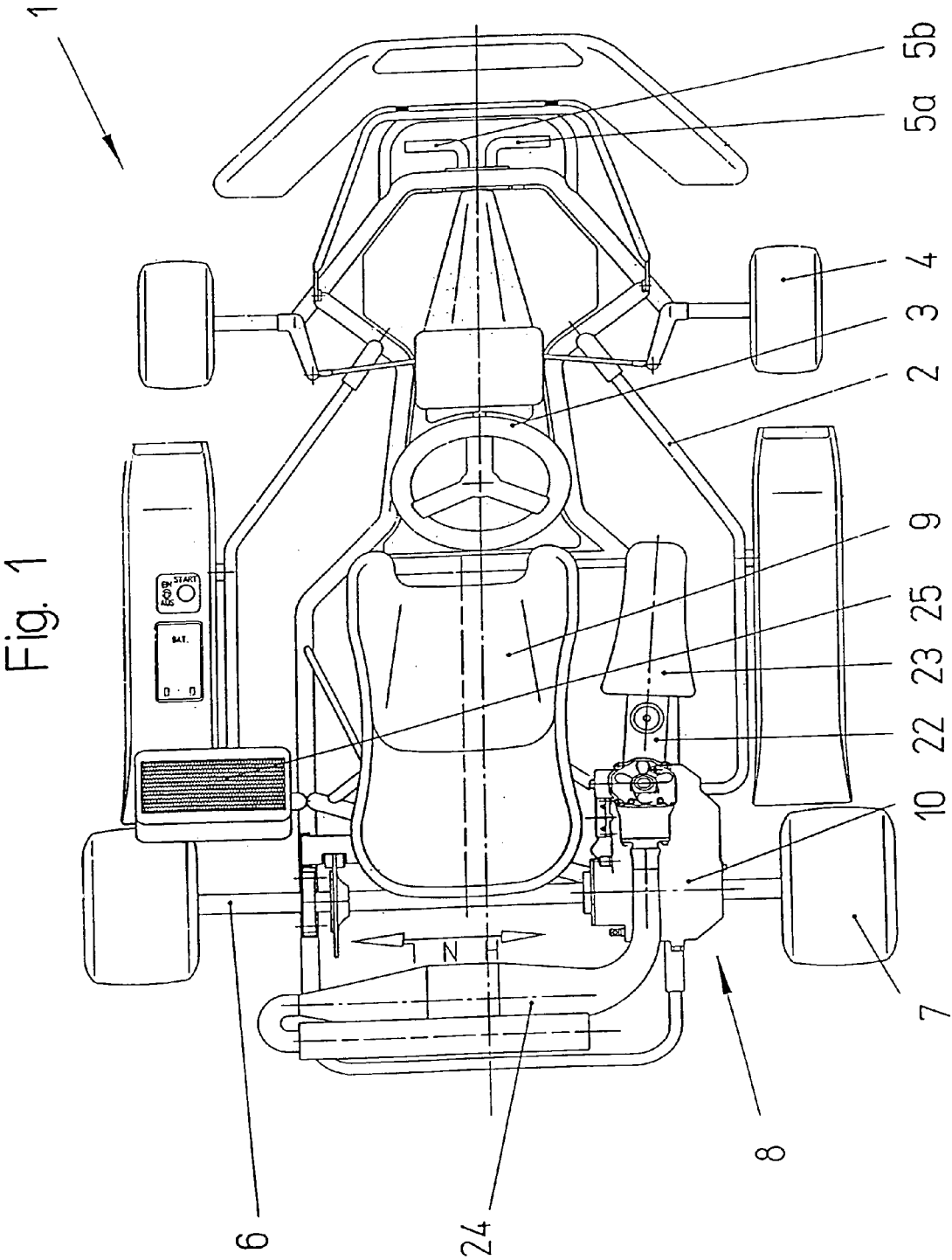
FIG. 1 is a go-kart as viewed from above.
Figure 2:
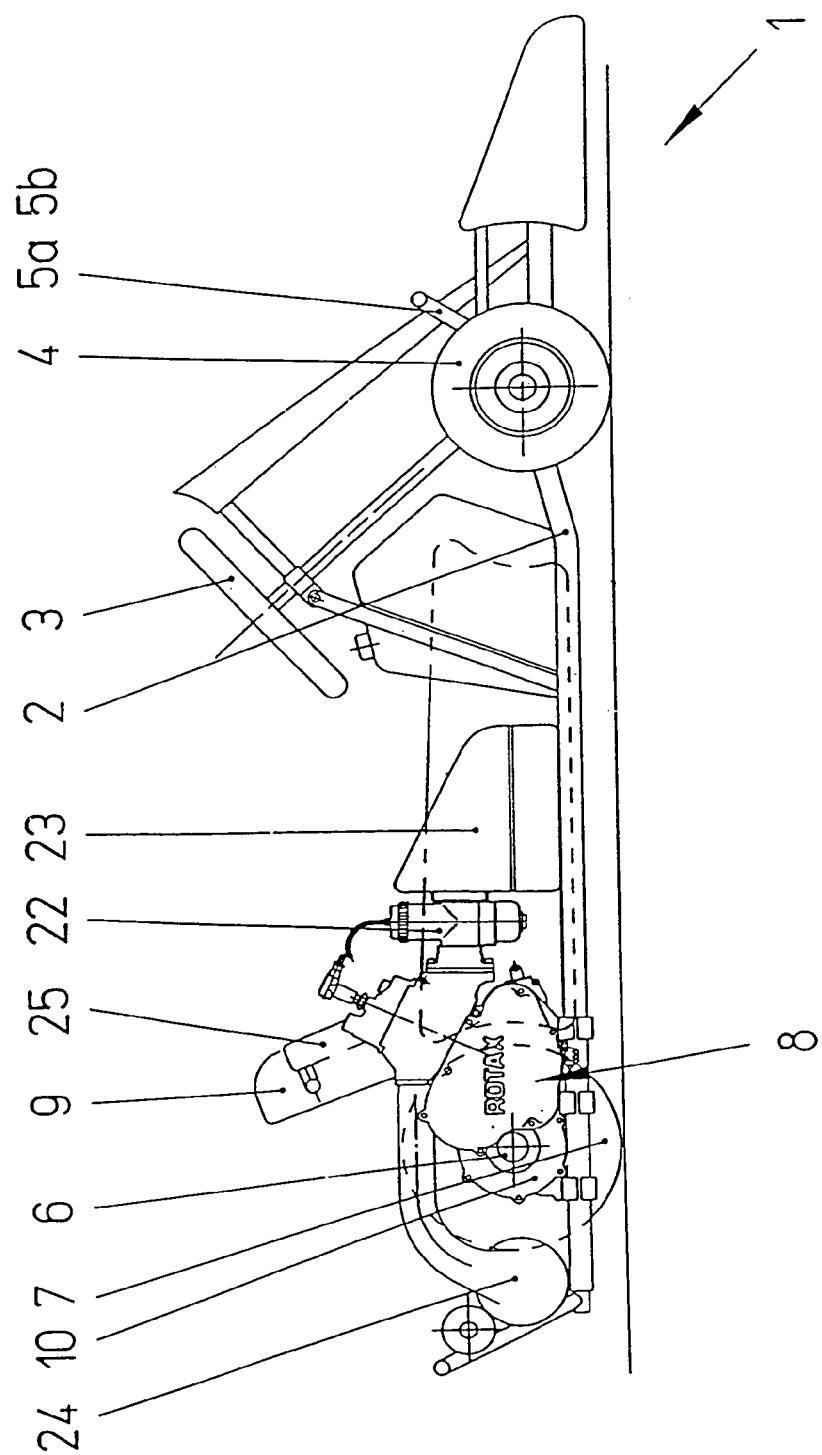
FIG. 2 is a side view of the go-kart illustrated in FIG. 1.

FIG. 1 and FIG. 2 show a motor vehicle 1, generally referred to as a go-kart, which is used for leisure and sporting activities. This vehicle has a chassis 2 that is a tubular structure, hereinafter referred to as a tubular chassis, on the front of which there are front wheels 4 that can be steered by a steering wheel 3. In addition, in the front part of the vehicle, there are pedals 5a and 5b, usually an accelerator pedal and a brake pedal: In the rear part of the tubular chassis 2 there is a rear-wheel drive shaft 6 that has wheels 7 mounted on its ends and which is driven by an engine-transmission unit 8. The engine-transmission unit 8 is arranged ahead of the rear-wheel drive shaft 6, to one side of the driver's seat, and is secured to the tubular chassis 2. At the engine end, the rear-wheel drive shaft 6 is supported in an engine-transmission housing 10 and at the opposite end in the tubular chassis 2. In principle, it would be possible to use a twin-engine drive system (with engine-transmission units arranged to the left and to the right of the driver's seat); in this case, the rear-wheel drive shaft 6 would be installed on both sides of the vehicle, in the engine-transmission housings.

Figure 3:
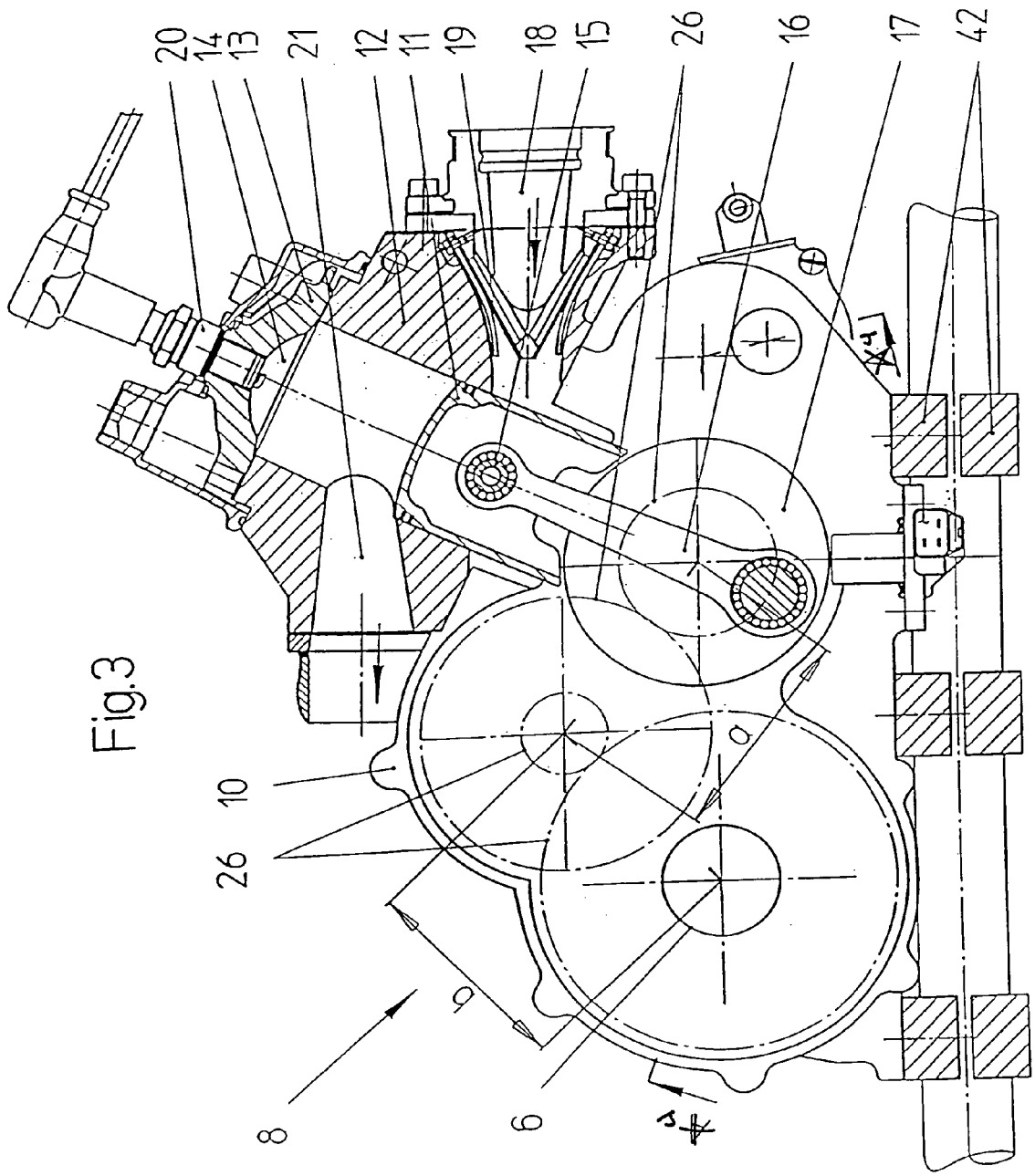
FIG. 3 is a cross section through the complete engine-transmission unit of the go-kart illustrated in FIG. 1, fitted in this example with a reciprocating-piston engine.

The engine-transmission unit 8 is shown in FIG. 2, and in greater detail in FIG. 3, in cross section. FIG. 3 shows the essential components of a reciprocating-piston, internal-combustion engine, namely, a piston 11, which moves back and forth in a cylinder 12, a cylinder head 13 that seals the cylinder 12 to the outside, thereby forming a combustion chamber 14, a wrist pin 15 and a connecting rod 16 that connects the piston 11 to the crank shaft 17 and converts the reciprocating motion of the piston 11 into a rotary movement of the crank shaft 17, and converts the thrust of the piston into engine torque.

FIG. 3 also shows the induction system 18—in this example, based on an inlet diaphragm 19—that charges the combustion chamber 14 with an air-fuel mixture, a spark plug 20 that ignites this mixture, and an exhaust manifold 21 for emptying the combustion chamber of the exhaust gases formed by the combustion process.

FIG. 1 and FIG. 2 also show some important, peripheral engine components, namely a carburetor 22 with its air filter 23, which is connected to the induction system 18 in order to produce the mixture of air and fuel, an exhaust system 24 that dampens the noise of the exhaust gasses, and a radiator 25 to cool the coolant water that circulates inside the engine unit.

The construction of the reciprocating-piston, internal-combustion engine described above as an example corresponds to a water-cooled, two-cycle, internal combustion engine with a diaphragm inlet, and a carburetor to produce the combustion mixture. Any other types of engine could be used provided they are based on the principles of an internal-combustion engine, for example, fuel-injected, two-cycle internal combustion engines, four-cycle internal combustion engines, or rotary-piston engines (see FIG. 3A and FIG. 4A).

Figure 3A:
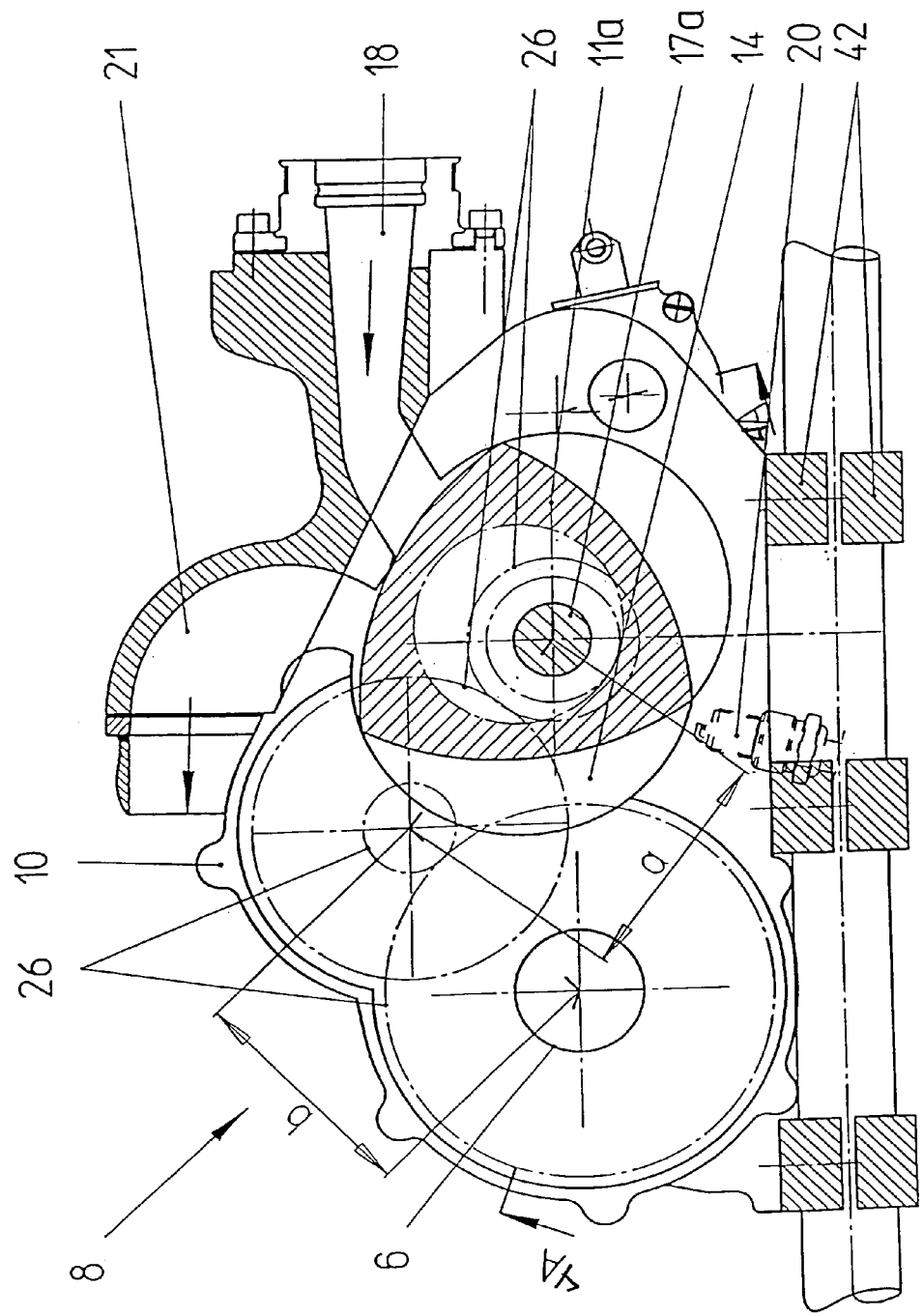
FIG. 3A is a cross section through a modified engine-transmission unit, fitted in this example with a rotary-piston engine.

FIG. 3A shows an engine-transmission unit 8 that incorporates a rotary-piston engine, in this case a Wankel engine. The drawing shows engine components such as the rotary piston 11*a*, the engine shaft 17*a*, the combustion chamber 14, spark plug 20, as well as inlet and exhaust manifolds 18, 21, respectively. The engine shaft 17*a* of the rotary-piston engine transmits engine torque, and its function thus corresponds to that of the crank shaft 17 shown in FIG. 3.

The engine torque that is available at the crank shaft 17 or engine shaft 17*a* is transmitted to the rear-wheel drive shaft that is installed in the engine-transmission unit through spur-type reduction gearing 26 that, in the present example, is a two-stage gearing, and is indicated in FIG. 3 or 3A by the reference circles for the individual gear wheels. It is important that the crank shaft or engine shaft 17, 17*a*, respectively, and the gear wheel 26 be accommodated in the common engine-transmission housing 10 with fixed, invariable shaft spacing between the individual stages of the gearing (I, II, in FIG. 4 and FIG. 4A). In FIG. 3 and FIG. 3A these inter-shaft spaces are labeled a and b, respectively. It is preferred that the common engine-transmission housing be designed as a closed unit so as to prevent the egress of lubricating oil and the ingress of dirt.

Figure 4:
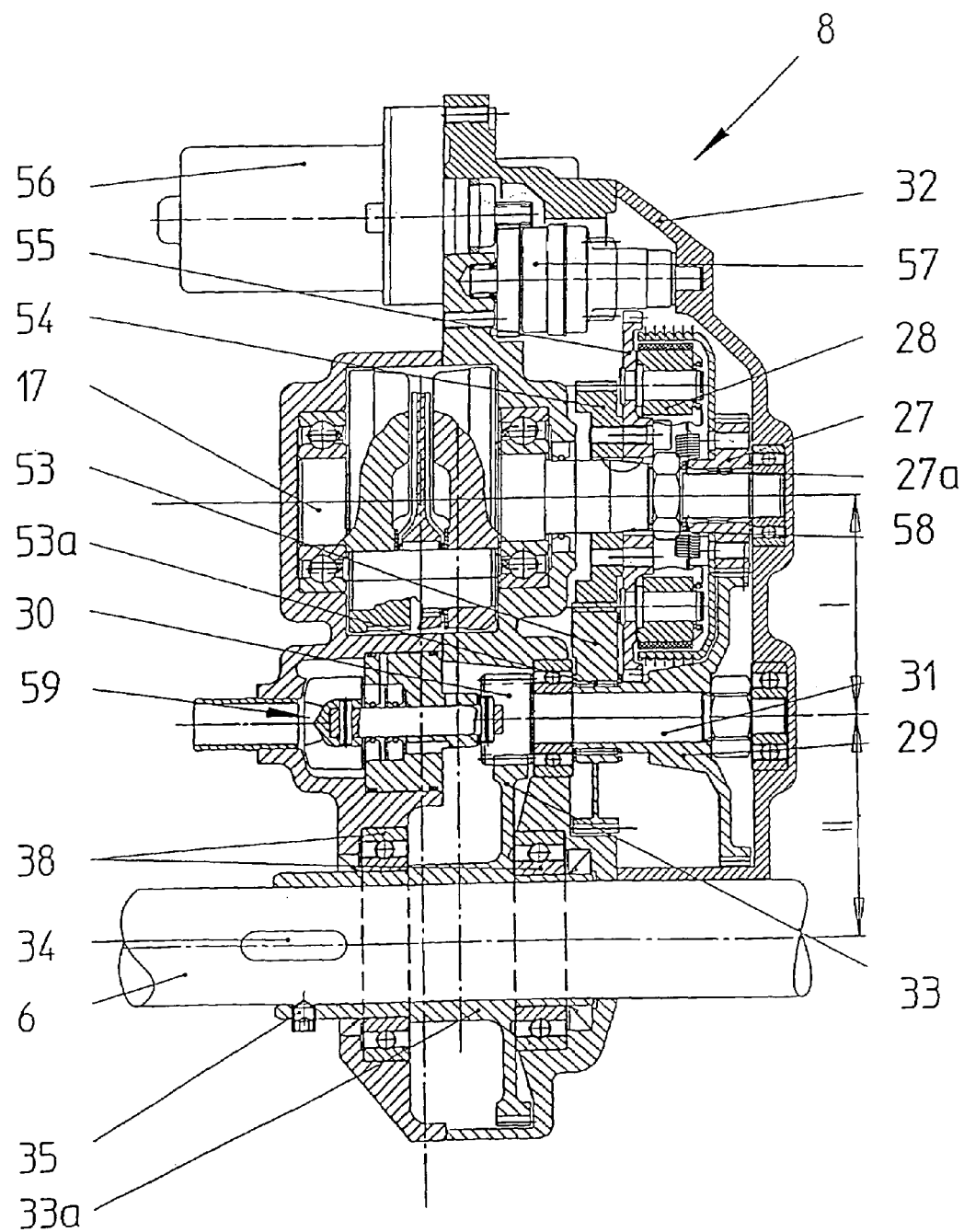
FIG. 4 is a cross section through the engine-transmission unit on the line 4—4 in FIG. 3 (reciprocating-piston engine)
Figure 4A:
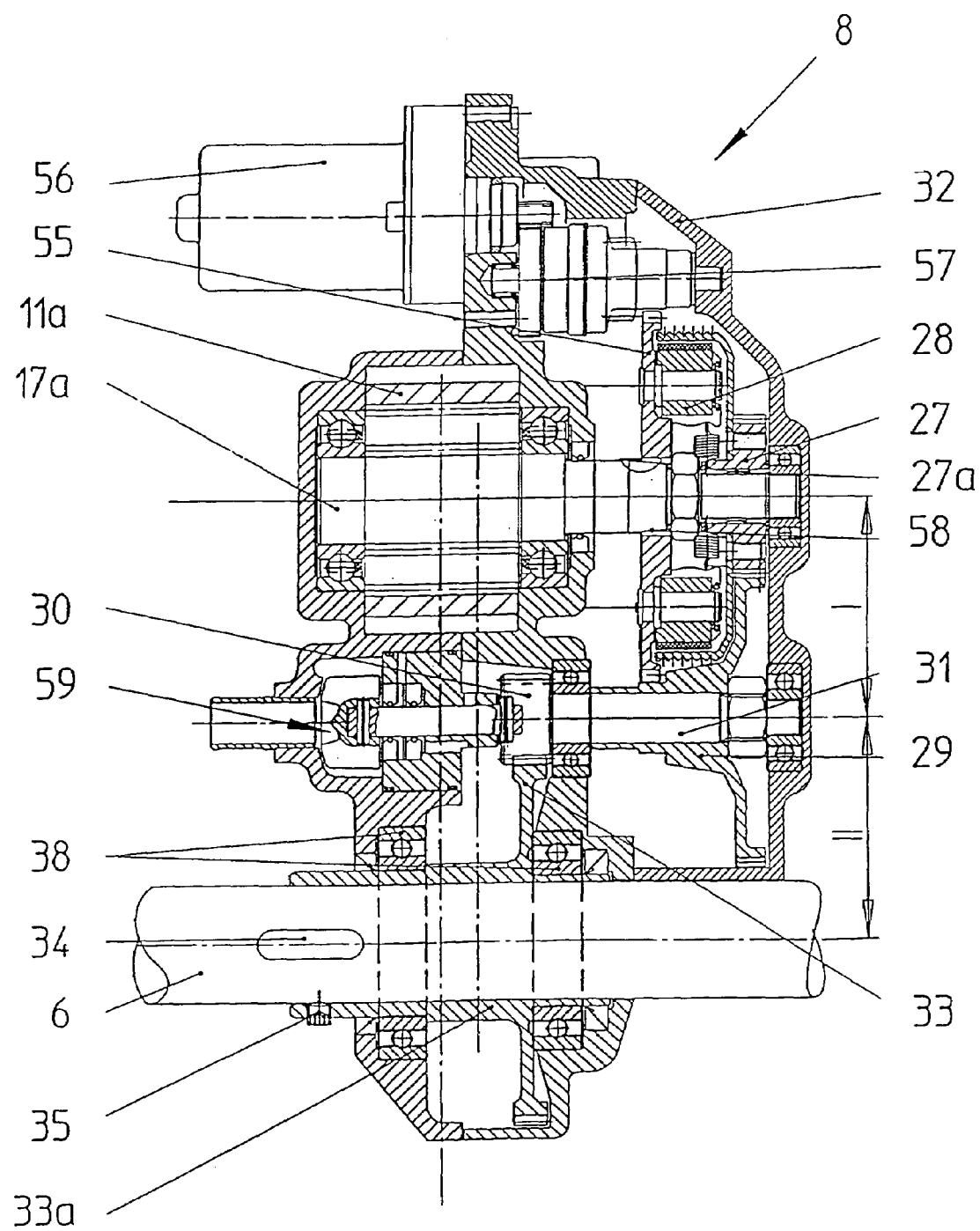
FIG. 4A is a corresponding cross section of the engine-transmission unit on the line 4A—4A in FIG. 3A (Wankel or rotary-piston engine)

FIG. 4 (the version with a reciprocating-piston engine) and FIG. 4A (the version with a rotary-piston engine) show a more detailed view of the reduction gearing 26; both of these drawings show the engine-transmission unit in cross section on the line 4—4 or 4A—4A (see FIG. 3 or 3A, respectively). From these drawings, it can be seen that the driving gear wheel 27 of the gearing 26, i.e., the first stage I of the gearing is mounted—preferably on a needle roller bearing 27*a* on the crank shaft or engine shaft 17, 17*a* and connected to this through a clutch 28, preferably a centrifugal clutch, whereby engine torque is introduced into the first stage I of the gearing. This clutch could be eliminated and the driving gear wheel could be connected directly with the crank shaft or engine shaft 17, 17*a*, although this would greatly reduce riding comfort.

In the preferred embodiment shown herein, the driven gear wheel 29 of the first stage I of the gearing, and the driving pinion 30 of the second stage II of the gearing are arranged on a common lay shaft (intermediate shaft) 31 that is installed in the engine-transmission housing 10 so as to be able to rotate. This makes it possible to achieve a particularly great reduction ratio in an extremely small space. The gear wheels 27 and 29 of the first stage I of the gearing—which mesh with each other—are made as replaceable gear wheels that can be exchanged for another pair of gear wheels that are of different diameters, once a cover 32 has been removed from the housing. This means that for very little cost, the reduction ratio of the gearing 26 can be matched to specific operating conditions.

Figure 7:
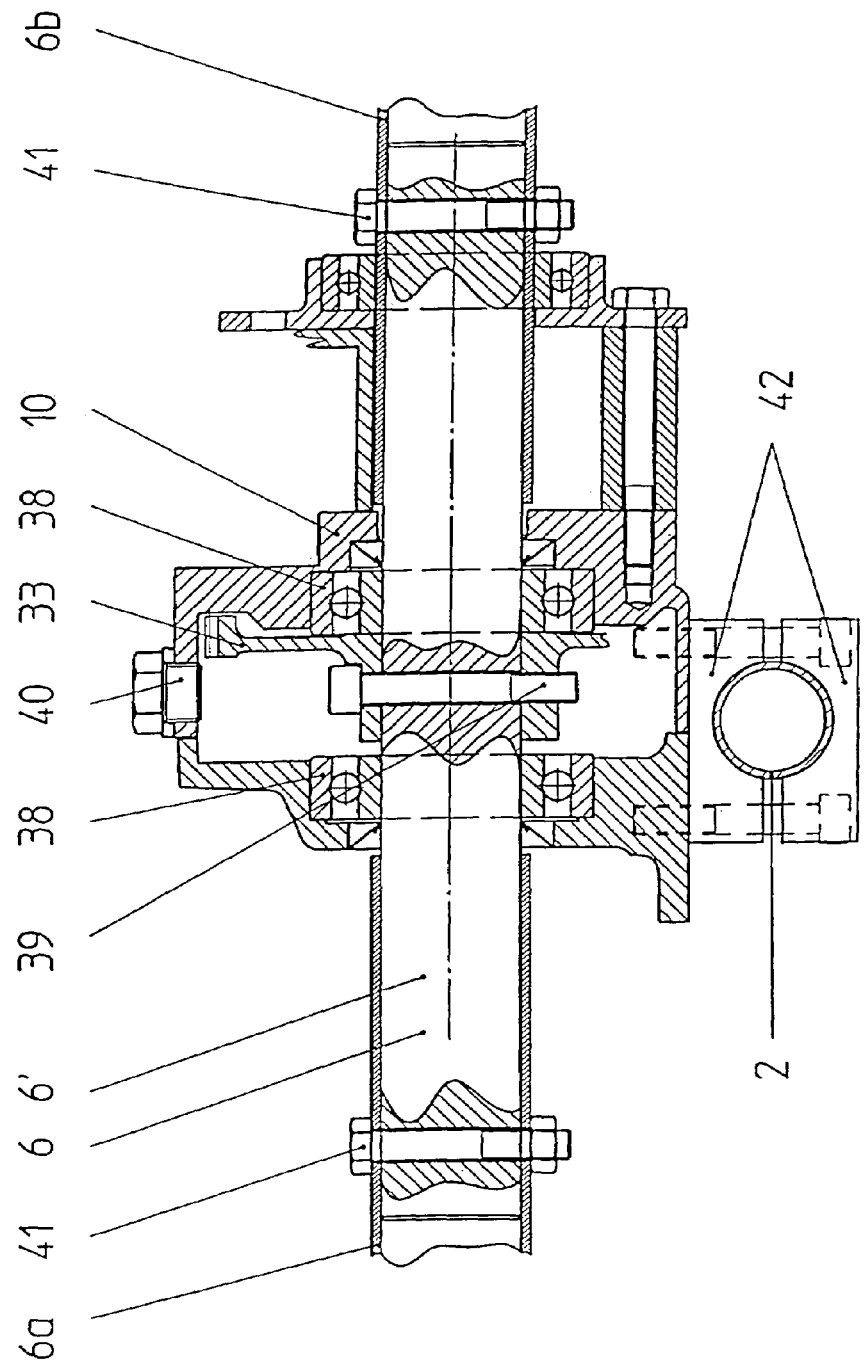
FIG. 7 is a cross section through another installation of the rear-wheel drive shaft in the engine-transmission housing according to the direct installation concept.

The driven gear wheel 33 of the second stage II of the gearing, which similarly meshes with the driving gear wheel 30 of the second stage of the gearing, is made in one piece with the hollow shaft 33*a*, and connected to the rear-wheel drive shaft 6—in the present example, through a key 34—so as to be removable therefrom. A set screw 35 prevents the rear-wheel drive shaft from moving axially. Other connecting elements, such a bolted connection 34*a* (see FIG. 10) can, of course, be used. Alternatively, a flexible coupling 36 (FIG. 5) or a friction clutch 37 (FIG. 6) can also be used as a connecting element between the hollow shaft 33*a* and the rear-wheel drive shaft 6; this provides additional protection against load peaks and torsional oscillations. The rear-wheel drive shaft 6 is mounted indirectly in the engine-transmission housing 10 through the hollow shaft 33*a* and ball bearings 38. It is, however, also possible to install the rear-wheel drive shaft 6 directly, i.e., directly through the ball bearings 38. This version of the installation is shown in FIG. 7. In this case, the driven gear wheel 33 does not have to be configured with a hollow shaft. The driven gear wheel 33 is connected to the rear-wheel drive shaft 6 by a bolt 39 that is accessible through a closable opening 40 in the engine-transmission housing 10. Other separable connecting elements can, of course, be used in place of the bolt 39; even a non-separable connection would be possible, even though this would entail the disadvantage that it would be necessary to dismantle the engine-transmission housing 10 should it be necessary to replace the rear-wheel drive shaft.

FIG. 7 also shows an embodiment in which the rear-wheel drive shaft 6 is made up of three sections, with a centre section 6' that is installed in the engine-transmission housing 10 so as to be able to rotate, and two additional shaft sections 6*a* and 6*b* that are each connected at one end to the centre shaft section 6' so as to be separable therefrom—in the example shown, by way of a bolted connection 41—and which have the rear wheels 7 mounted on their outboard ends. Dividing the rear-wheel drive shaft 6 into three sections in this way entails the advantage that in the event of a shaft failure, only the damaged section of the shaft has to be replaced, which greatly reduces the cost (time and monetary) of repairs.

The engine-transmission unit 8 or the engine-transmission housing 10 is secured in the chassis 2, which is in the form of a tubular structure, by bolted clamps 42 (see FIGS. 3 and 3A, and FIG. 5 and FIG. 7). In the embodiment shown in FIG. 3, three such bolted clamps are used. In theory, one such bolted clamp 42 would suffice; such a minimal solution would entail very high mechanical loads in the area of the clamp 42, and would not provide reliable support. The bolted clamps can be so designed that they can be secured to one chassis tube of the tubular chassis 2 (FIG. 7) or to two parallel chassis tubes 2*a*, 2*b* (FIG. 5). Strictly speaking, the version that uses two parallel chassis tubes 2*a*, 2*b* is statically unproven, but in contrast to the first version it ensures a more secure attachment even if the rear-wheel drive shaft has been removed. (In FIG. 5 and FIG. 7, for purposes of greater clarity, the bolted clamps 42 are shown rotated through 90° about the rear-wheel drive shaft).

Figure 8:
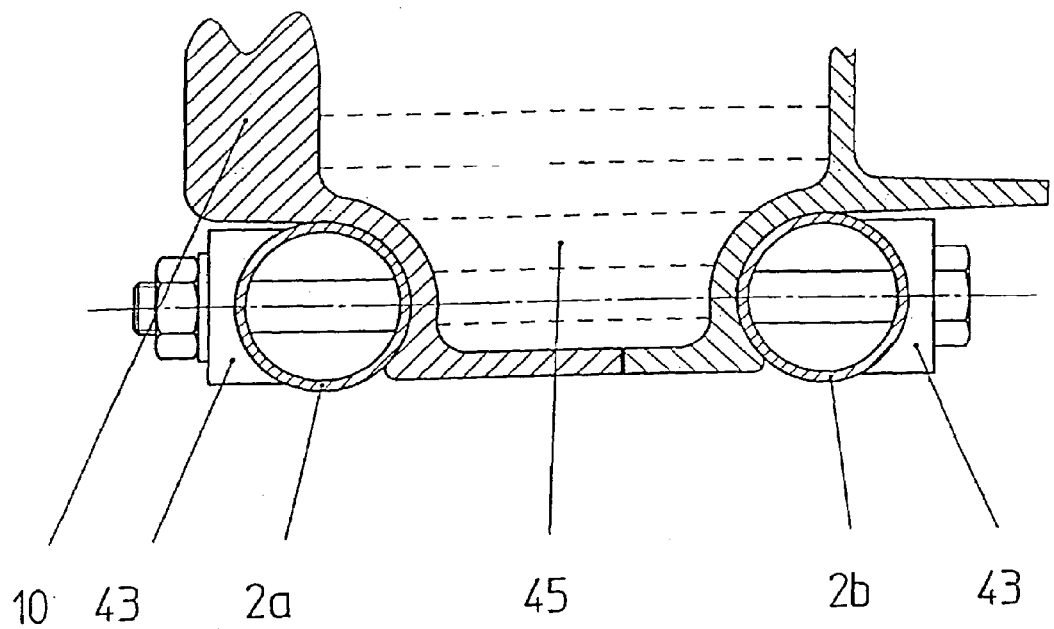
FIG. 8 is a cross section showing the attachment of the engine-transmission unit to the vehicle frame using bolted clamps.
Figure 9:
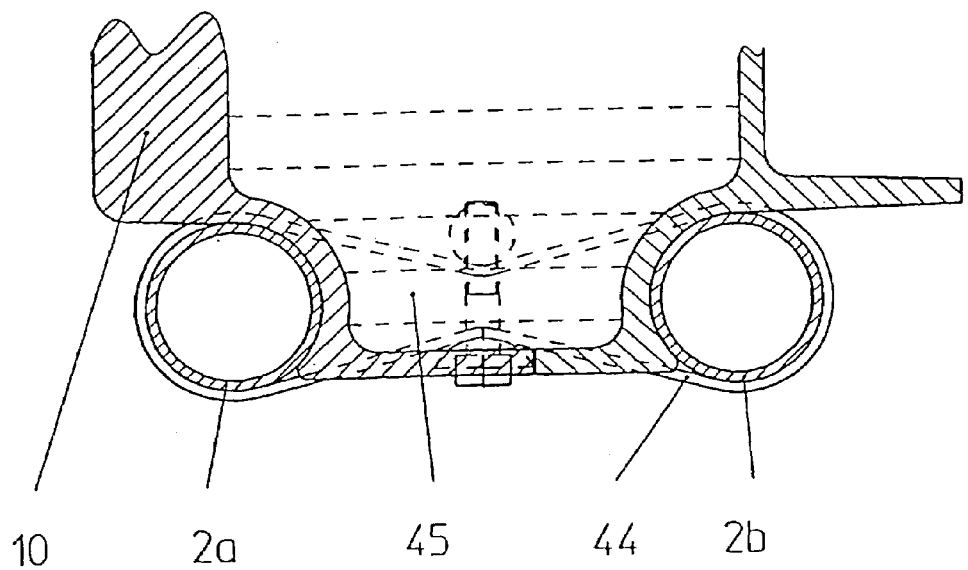
FIG. 9 is a cross section showing the attachment of the engine-transmission unit to the vehicle frame using strap clamps.

An alternative installation concept is shown in FIG. 8 and FIG. 9. In this version, the engine-transmission housing 10 partially fills the space between parallel chassis tubes 2*a*, 2*b* and is clamped between the two chassis tubes 2*a* and 2*b* by bolted clamps 43 (in FIG. 8) or by strap clamps 44 (in FIG. 9). This version of the installation entails two advantages: first, no parts of the attachment system protrude below the underside of the vehicle and thereby reduce its ground clearance; second, the extra housing capacity that is gained between the chassis tubes 2*a*, 2*b* can be used as an addition oil reservoir 45 (oil pan).

In order to make it possible to change the reduction ratio when the vehicle is in motion, the second stage II of the gearing can also be configured as a multi-gear change-speed transmission. As an example, FIG. 10 shows a two-gear, change-speed transmission. The second stage II of the gearing then incorporates two pairs of gear wheels 30a/33a and 30b/33b with diameters that form different ratios. The rear-wheel drive shaft 6 is once again installed indirectly by way of a hollow shaft 46 that, in this embodiment, is an independent part that is materially separated from the driven gear wheels 33a, 33b. It is preferred that the driven gear wheels 33a, 33b be mounted on the hollow shaft 46 on needle roller bearings 47 so as to be able to rotate. Since the mechanical load on the bearing points is relatively small, it is also possible to dispense with the needle roller bearings 47. Between the driven gear wheels 33a, 33b there is a gearshift sleeve 48 that is mounted on the hollow shaft 46 and can move axially on the splines 46a; this sleeve can be displaced by a selector fork 49a that can be adjusted from outside the housing by a selector rod 49 (see the double arrow, FIG. 10, with the gear positions S0, S1, and S2).

Three positions are possible in the embodiment shown. In the neutral position S0, the gearshift sleeve 48 is centered exactly between the driven gear wheels 33a and 33b; there is no non-positive connection between the driven gear wheels 33a, 33b and the rear-wheel drive shaft 6, i.e., no power is transmitted. In 1st gear (gear position S1), the gearshift sleeve 48 is pressed against the driven gear wheel 33a by the selector fork 49a; it enters into detent with this, and thereby forms a non-positive connection to the hollow shaft 46 or the rear-wheel drive shaft 6. In 2nd gear (gear position S2), the gearshift sleeve 48 is pressed against the driven gear wheel 33b by the selector fork 49a; it enters into detent with this and thereby forms a non-positive connection to the hollow shaft 46 or the rear-wheel drive shaft 6, respectively. The reduction ratio is slightly less than in 1st gear.

A characteristic feature of this is that the gear-wheel pairs 30a/33a and 30b/33b of the change-speed transmission are meshed with each other constantly, regardless of the position of the gear-shift sleeve.

The three different positions for the gear-shift sleeve S0, S1 and S2, are precisely defined by indexing system 50. This indexing system 50 is situated on the selector rod 49 of the selector fork 49a and comprises three adjacent grooves 51 and an associated ball 52 with a threaded pin 52' (see FIG. 10); the ball 52 snaps into the corresponding indexing groove S0, S1, or S2, depending on the position of the gear-shift sleeve that has been selected.

The two-stage engine-transmission system that has been described, which incorporates a lay shaft 31, also permits the space-saving integration of additional engine components; a balance weight (in the case of a reciprocating-piston engine) can be incorporated very easily if a balance weight 53 that is in the form of a gear wheel is mounted on the lay shaft 31 so as to be able to rotate, e.g., on a needle-roller bearing 53a; this balance weight is driven by a gear wheel 54 of the same diameter (reduction ratio 1:1) that is arranged on the crank shaft 17 (see FIG. 4). The balance weight can be omitted from the version that uses a rotary-piston engine since such an engine does not generate any oscillating inertial forces.

The crank shaft 17 or engine shaft 17a still provides enough space for a starter ring gear 55 that is driven by a starter motor 56 through an interposed starter lay shaft gearing 57 (see FIGS. 4 and 4A). The starter ring gear 55, the driving pinion 54 for the balance weight, and the clutch 28 can be connected to each other on a tapered section 58 on the crank shaft 17. This permits particularly rapid installation and removal.

Finally, as can be seen from FIGS. 4 and 4A, a water pump 59 can be accommodated in the engine-transmission housing 10 so that it takes up very little room because it is installed coaxially with the lay shaft 31 and driven by this (see also FIG. 10).

Proceeding from the two-stage change-speed gearing that is shown in FIG. 10, FIG. 11 shows an embodiment in which the ignition circuit 60 shown diagrammatically in FIG. 11 is interrupted briefly when 2nd gear (position S2) is selected from 1st gear (position S1). Because of this brief interruption of the ignition, the load is removed from the dogs 48a of the gear-shift sleeve 48, and it can be meshed more easily with the matching recesses in the driven gear wheel 33 if the selector rod 49 is moved to the left (lever position S2), as described above in connection with FIG. 10.

Cables, such as Bowden cables 61, that are secured to the levers 62 or 63 operate the selector rod 49. In particular, when shifting from 1st gear (position S1) to 2nd gear (position S2) the lever 63 is moved to the left, as indicated in FIG. 11, when a spring 64 that is associated with the selector rod 49 is compressed and thereby placed under tension. In order that the ignition can be interrupted, a contact screw 65a is installed in the plate 65 that is connected to the selector rod 49, and during the shifting process this comes into contact with the adjuster screw 63a on the lever 63 as it moves to the left, just before it comes to rest against a stop 32a. This connects the contact screw 65a to ground, and the ignition is interrupted. This interruption is very brief because the plate 65 then moves further to the left during the shifting process, which means that the contact screw 65a moves out of contact with the adjuster screw 63a.

For reasons of safety, both hands should remain on the steering wheel 3, even when shifting gears. In order to ensure that this is done, a preferred method for switching gears by means of a shift lever 66 that is mounted on the steering wheel 3 is proposed, said shift lever 66 being connected to the selector rod 49 by cables, such as Bowden cables 61. The particular gear wheels 33a, 33b for 1st or 2nd gear, respectively, can be connected non-positively to the hollow shaft 46 or the rear-wheel drive shaft 6 as desired by means of the selector fork 49a and the gear-shift sleeve 48.

When the shift lever 66 is operated so as to shift from 1st gear to 2nd gear when the transmission is under load, the gear shift lever 66 is moved into the S2 position. The cable 61 moves the lever 63 so that it compresses the spring 64. This spring 64 then presses against the selector rod 49. As soon as the adjuster screw 63a touches the contact screw 65a, the ignition system is grounded out and no power is transmitted through the gear-shift sleeve 48. At this precise moment, the spring 64 presses the selector rod 49 into 2nd gear. This means that the breaker contact (contact screw 65a) is opened once again, because the lever 63 has come to rest against the stop 32a on the housing 10. Thus, the ignition is switched off only for the minimum amount of time that is required.

It has been found to be an advantage, particularly in the embodiment with a multi-gear gearing, to incorporate an overload coupling in the drive train. During the gear-shift process, the centrifugal clutch 28 (see FIG. 4) usually remains connected—which is to say that is usually connected when the engine is running fast. Torque peaks can occur in the drive train because of the sudden and abrupt change in engine speed that is brought about by shifting from one gear to another. Such torque peaks impose a severe strain on all the mechanisms and also downgrade the vehicle's performance, namely, its traction. As has already be shown in FIG. 5 and FIG. 6, this overload coupling can be a flexible coupling 36 or a friction clutch 37 that is incorporated in the rear-wheel drive shaft 6, outside the engine-transmission housing 10. In principle, however, the overload coupling can be accommodated within the engine-transmission housing 10, for example, if it connects the driven gear wheel 33 and the hollow shaft 33a to each other, providing that the driven gear wheel 33 and the hollow shaft 33 a are two elements that are separate from each other (this embodiment is not shown herein).

Another possibility is to arrange the overload coupling between the lay shaft 31 and the driven gear wheel 29 of the first stage I of the gearing. This variant is shown in FIG. 12. As an example, in this variant the overload coupling is a friction clutch that comprises at least one clutch plate 69a and a spring pressure plate 67a that presses the clutch plate against the driven gear wheel 29, thereby permitting the transmission of torque. Load peaks are evened out when the clutch slips.

It has found to be particularly advantageous to incorporate the friction clutch between the centrifugal clutch 28 and the driving gear wheel 27 of the first stage I of the gearing, since this is where the torque that is to be transmitted is smallest, so that the friction clutch can be made comparatively small, and thus take up very little space. By way of an example, FIG. 12 shows an embodiment in which the clutch housing 28a of the centrifugal clutch 28 is clamped between two clutch plates 69 by means of a spring pressure plate 67 and a tensioning nut 68, and thus permits only a limited frictional connection to the driving gear wheel 27.

The foregoing description is meant to be illustrative of the scope of the present invention and is not meant to be limited solely to the embodiments shown and described. To the contrary, those skilled in the art will readily recognize that variations of the embodiments described may be substituted without departing from the scope of the present invention.

What is claimed is:

1. A drive assembly for a kart, comprising:
    an internal combustion engine adapted to be mounted to the kart, the engine comprising an output shaft, and a removable cover, the cover at least in part defining a housing;
    a drive shaft extending through and rotating within the housing of the engine;
    a driving gear disposed on the output shaft of the engine within the housing;
    a driven gear disposed on the drive shaft within the housing, the driven gear being releasably connected to the drive shaft through a connecting element such that the drive shaft may be removed from the engine without removal of the driven gear from the engine; and
    a reduction gearing including at least one reduction gear disposed on an intermediate shaft within the housing, the reduction gearing operatively interconnecting the driving gear with the driven gear within the housing;
    the output shaft, the drive shaft and the intermediate shaft being separated by distances within the housing that are fixed and invariable; and
    at least one of the driving gear and the reduction gear being releasably connected to the shaft on which it is disposed such that when the cover is removed from the engine that gear may be removed from the engine without the removal of its shaft.

2. The drive assembly of claim 1, wherein the drive shaft is a rear wheel drive shaft.

3. The drive assembly of claim 1, wherein the engine is a reciprocating piston engine.

4. The drive assembly of claim 1, wherein the engine is a rotary piston engine.

5. The drive assembly of claim 1, wherein the housing is a closed structure.

6. The drive assembly of claim 1, wherein the driving gear is connected to the output shaft through a coupling to rotate with the output shaft.

7. The drive assembly of claim 6, wherein the coupling is a centrifugal clutch.

8. The drive assembly of claim 1, wherein the connecting element is accessible through a closeable opening in the housing.

9. The drive assembly of claim 1, wherein the drive shaft comprises a center section rotatably disposed within the housing and two additional shaft sections removably connected at either end of the center section, and wherein wheels are attached to outer ends of the two additional shaft sections.

10. The drive assembly of claim 1, wherein the driven gear includes a hollow shaft integrally molded therewith,
    wherein the hollow shaft encircles the drive shaft, and
    wherein the connecting element is a releasable key.

11. The drive assembly of claim 1, further comprising an overload coupling operatively connecting the output shaft with the driving gear.

12. The drive assembly of claim 1, wherein the driven gear includes a hollow shaft integrally molded therewith,
    wherein the hollow shaft encircles the drive shaft, and
    wherein the hollow shaft connects with the drive shaft via a flexible coupling.

13. The drive assembly of claim 12, wherein the flexible coupling is a rubber element.

14. The drive assembly of claim 12, wherein the flexible coupling is a friction clutch.

15. The drive assembly of claim 1, wherein the reduction gearing further comprises a second gear disposed on the intermediate shaft.

16. The drive assembly of claim 15, wherein at least one of the gears on the intermediate shaft is replaceable by gears of varying diameters to provide different reduction ratio.

17. The drive assembly of claim 16, wherein the housing further comprises a removable cover enclosing the at least one replaceable gear.

18. The drive assembly of claim 15, further comprising:
    a starter ring gear disposed on the output shaft; and
    a starter motor,
    the starter motor driving the starter ring gear through a gear disposed on the intermediate shaft.

19. The drive shaft assembly of claim 15, further comprising:
    a cooling water pump arranged coaxially with, and being driven by, the intermediate shaft.

20. The drive assembly of claim 1, wherein the driven gear includes a hollow shaft integrally molded therewith, the hollow shaft encircling the drive shaft, the driven gear being being releasably connected to the drive shaft via the hollow shaft.

21. A kart, comprising:
    a frame having a front portion, a rear portion, and two side portions;
    the drive assembly of claim 1, wherein the engine is mounted to the frame and the drive shaft is a rear axle, the rear axle being suspensionlessly rotatably connected to the frame; and
    a pair of wheels disposed on the rear axle;
    a front axle suspensionlessly rotatably connected to the frame;
    a pair of wheels disposed on the front axle;

a seat disposed on the frame in between the front axle and the rear axle.

22. The kart of claim 21, wherein the engine is disposed near the rear portion and near one of the side portions of the frame.

23. The kart of claim 21, wherein the drive shaft comprises a center section rotatably disposed within the housing and two additional shaft sections removably connected at either end of the center section, and the rear wheels being disposed on outer ends of the two additional shaft sections.

24. The kart of claim 21, wherein the reduction gearing further comprises a second gear disposed on the intermediate shaft.

25. The kart of claim 21, wherein at least one gear on the intermediate shaft is replaceable by gears of varying diameters to provide different reduction ratios.

26. A drive assembly for a kart, comprising:
- an internal combustion engine adapted to be mounted to the kart, the engine comprising an output shaft and a removable cover, the cover at least in part defining a housing;
- a drive shaft extending through and rotating within the housing of the engine;
- a driving gear disposed on the output shaft of the engine within the housing;
- a driven gear disposed on the drive shaft within the housing;
- a reduction gearing including at least one reduction gear disposed on an intermediate shaft within the housing, the reduction gearing operatively connecting the driving gear to the driven gear within the housing;
- a balance weight mounted on the intermediate shaft and rotatable thereon, wherein the balance weight is configured as a first spur gear; and
- a second spur gear mounted on the output shaft, wherein the diameters of the first and second spur gears are substantially identical, wherein the first spur gear is driven by the second spur gear, wherein the shafts of the driving pinion, driven pinion, and reduction gearing are separated by distances within the housing that are fixed and invariable, and wherein the reduction gearing comprises first and second stages disposed on a common lay shaft.

* * * * *